(12) United States Patent  
Kamata

(10) Patent No.: US 6,188,841 B1  
(45) Date of Patent: Feb. 13, 2001

(54) LENS-FITTED FILM UNIT WITH PLASTIC TAKING LENS

(75) Inventor: Kazuo Kamata, Kanagawa (JP)

(73) Assignee: Fuji Photo Film Co., Ltd., Kanagawa (JP)

(*) Notice: Under 35 U.S.C. 154(b), the term of this patent shall be extended for 0 days.

(21) Appl. No.: 09/317,941

(22) Filed: May 25, 1999

(51) Int. Cl.$^7$ .............................. G03B 3/00; G03B 13/00; G02B 7/02

(52) U.S. Cl. .................................. 396/6; 396/97; 359/820

(58) Field of Search ................................. 396/6, 91, 97, 396/814; 359/820

(56) References Cited

U.S. PATENT DOCUMENTS 5,612,826 * 3/1997 Ohshita ........................... 359/820  
5,679,946 * 10/1997 Mukai et al. ........................ 396/97  
5,845,159 * 12/1998 Goto ................................ 396/97

* cited by examiner

*Primary Examiner*—Alan A. Mathews  
(74) *Attorney, Agent, or Firm*—Young & Thompson

(57) ABSTRACT

A lens-fitted film unit is provided with a thermally expandable axial distance adjusting member which has a thermal expansion coefficient greater than plastic lens elements of a taking lens held by an axially movable lens holder and disposed between the lens holder and a stationary shutter cover and which expands or contracts in accordance with a change in ambient temperature to change an axial distance between the lens holder and a film plane so as thereby to shift a focal point of the taking lens in an axial direction to compensate a variation of the focal length of the taking lens due to a change in refractive power of the plastic lens element which is caused by axial expansion or axial contraction of the plastic lens element due to the change in ambient temperature.

16 Claims, 8 Drawing Sheets

LENS-FITTED FILM UNIT WITH PLASTIC TAKING LENS

BACKGROUND OF THE INVENTION

1. Field of the Invention

The invention relates to a lens-fitted film unit with a taking lens comprising injection molded plastic lens elements.

2. Description of Related Art

Lens-fitted film units having been on the market are inexpensive and make one easily enjoy taking pictures. Such a lens-fitted film unit having a case in which a simple exposure mechanism is installed and a roll of film is pre-loaded. The lens-fitted film unit is widely spread because of the convenience that it can be gotten whenever and anywhere one wishes to take pictures and is put to a photo-shop as it is for processing and printing. There are variety of lens-fitted film units ranging from the most simplified unit which incorporates a fundamental exposure mechanism only to the most sophisticated unit which is equipped with a taking lens suitable for telephotography and/or a strobe unit for night photography and indoor photography. These lens-fitted film units give one a wide choice according to one's intentions.

One of advantages of the lens-fitted film units is low production costs. Since it is mandatory to provide the lens-fitted film units at as low costs as possible, such a lens-fitted film unit is under the necessity of having a quite simplified structure. For example, the taking lens is held in position by a lens holder formed with a fixed aperture so as to focus images of standard sharpness of as many objects as possible. The taking lens comprises one or two lens elements. The taking lenses have focal lengths from about 30 mm to 35 mm for lens-fitted film units with a 35 mm format film pre-loaded therein and a focal length of about 24 mm for lens-fitted film units with a 24 mm format film pre-loaded therein. Further, for lens-fitted film units suitable for telephotograph, the taking lenses have focal lengths increased to about 100 mm.

Typically, plastic lenses formed by injection molding are employed as component lens elements of the taking lens. While such an injection molded plastic lens is suitable to be mass-produced and produced at production costs lowered as compared with glass lens elements, the injection molded plastic lens has the drawback that it easily varies its refractive power due to a change in ambient temperature. In particular, the injection molded plastic lens expands to weaken its curvature with the result of becoming more apt to decrease the refractive power as the ambient temperature rises. If the refractive power of the taking lens becomes too small, the taking lens shifts its focal point behind a film strip situated in a predetermined film plane, forming a blurry image on the film strip.

Therefore, the two component taking lens for the lens-fitted film unit is typically comprised of two plastic lens elements having different thermal expansion coefficients so as to control a shift of the focal point of the taking lens due to a change in ambient temperature. The longer the focal length of the taking lens is, the grater a change in refraction power of taking lens caused due to a change in ambient temperature becomes, and when the taking lens has a focal length longer than 50 mm, it is difficult to control a change in refractive power of the taking lens only by using different materials for the two plastic lens elements. In particular, when the taking lens suitable for telephotograph has a focal length of approximately 100 mm, it is completely impossible to control a change in refractive power of the taking lens only by using different materials for the two plastic lens elements.

SUMMARY OF THE INVENTION

It is accordingly an object of the invention to provide a lens-fitted film unit which can always form a sharp image without being affected by a change in ambient temperature even though it is equipped with a taking lens comprising an injection molded plastic lens element.

The foregoing object of the invention is accomplished by providing a lens-fitted film unit in which a taking lens comprising an injection molded plastic lens element is held by an axially movable lens holder accompanied by thermally expandable axial distance adjusting means disposed between the lens holder and a predetermined film plane in which an unexposed photographic film strip is situated. The thermally expandable axial distance adjusting means forces the lens holder along an axis of the taking lens to vary the axial distance between the lens holder from the predetermined film plane when expanding or contracting in accordance with a change in ambient temperature, so as thereby to shift the focal point of the taking lens with the result of compensating a variation of the focal length of the taking lens due to a change in refractive power of the plastic lens element which is caused by axial expansion or axial contraction due to the change in ambient temperature. In the case where the taking lens comprises two injection molded plastic lens elements, it is preferred to dispose the thermally expandable axial distance adjusting means between the two plastic lens elements so that the axial distance adjusting means forces either one of the two plastic lens elements along the axis of the taking lens to vary the axial distance between the two plastic lens elements when expanding or contracting in accordance with a change in ambient temperature. The focal point of the taking lens is shifted and adjusted to the predetermined film plane to compensate a variation of focal length of the taking lens due to changes in refractive power of the plastic lens elements which are caused by axial expansion or axial contraction due to the change in ambient temperature. The axial distance adjusting means may preferably take the form of a ring disposed in the optical axis. The axial distance adjusting ring disposed between two plastic lens elements is preferably formed as a shield ring operative to block off peripheral light rays from the outside of an aimed scene or a fixed aperture ring operative to control the amount of light rays reaching the film strip.

Further, the axial distance adjusting means may take the form of thermally extendable axially positioning rod accompanied by a drive spring. The positioning rod extends in accordance with a rise in ambient temperature to define an axial position to which the lens holder or the taking lens is permitted to shift along the axis of the taking lens, and then the drive spring forces the lens holder or the taking lens to the axial position.

In either case, the axial distance adjusting means is preferable to have a thermal expansion coefficient greater than the lens element of the taking lens and may be made of one of metals including zinc, selenium, aluminum, permaroy and alloys thereof or one of non-metallic materials including ebonite, plastics and woods.

The axial distance adjusting means may comprise a bimetal plate capable of being warped in a plane perpendicular to the optical axis to change an apparent axial thickness thereof in accordance with a change in ambient temperature so as thereby to change an axial distance between the lens holder from the predetermined film plane with the result of adjusting the focal point of the taking lens to the predetermined film plane. The bimetal plate may take the form of a bimetal ring formed with a plurality of sections which are defined by slits. The bimetal ring at the sections is bent in a circumferential direction to change an apparent axial thickness thereof in accordance with a change in ambient temperature so as thereby to change an axial distance between the lens holder from the predetermined film plane with the result of adjusting the focal point of the taking lens to the predetermined film plane.

According to another embodiment of the invention, the unit body at least between the taking lens and the predetermined film plane is made to be capable of thermally expanding and contracting in a direction of an axis of the taking lens to change an axial distance between the taking lens and the predetermined film plane in accordance with a change in ambient temperature so as thereby to shift a focal point of the taking lens.

The lens-fitted film unit equipped with the axial distance adjusting means disposed between the lens holder and the predetermined film film plane always forms a sharp image on the film strip even when there occurs a change in ambient temperature as great as the plastic lens elements of the taking lens produce changes in refractive power. In addition, in the lens-fitted film unit equipped with the axial distance adjusting means interposed between two plastic lens elements of the taking lens so as to shift either one of the two plastic lens elements when there occurs a change in ambient temperature, a variation of the focal length of the taking lens is compensated with only smaller expansion or contraction of the axial distance adjusting means as compared with shifting the two plastic lens elements of the taking lens as one whole. Forming the axial distance adjusting ring disposed between the two plastic lens elements of the taking lens as a shield ring operative to block off peripheral light rays from the outside of an aimed scene or a fixed aperture ring operative to restrict the amount of light rays reaching the film strip prevents an increase in the number of parts for the lens-fitted film unit and simplifies the structure of the lens-fitted film unit surrounding the taking lens. The bimetal ring which has circular-arcuate bendable sections defined slits as axial distance adjusting means produces a large change in apparent axial thickness thereof by which an increased change in axial distance between the taking lens and the predetermined film plane is provided. Therefore, this type of bimetal ring is suitable for compensating a variation of focal length of the taking lens even having a long focal length due to a change in ambient temperature.

In the embodiment in which the axial distance adjusting means is provided by making the unit body to be capable of thermally expanding and contracting at least between the two component taking lens and the predetermined film plane in a direction of an axis of the taking lens, a variation of focal length of the taking lens which is caused due to a change in ambient temperature is compensated by only employing two plastic lens elements made of materials having different thermal expansion coefficients, which makes it unnecessary to use structural parts modified in shape and/or special parts and consequently prevents an increase in production cost of the lens-fitted film unit.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 3:
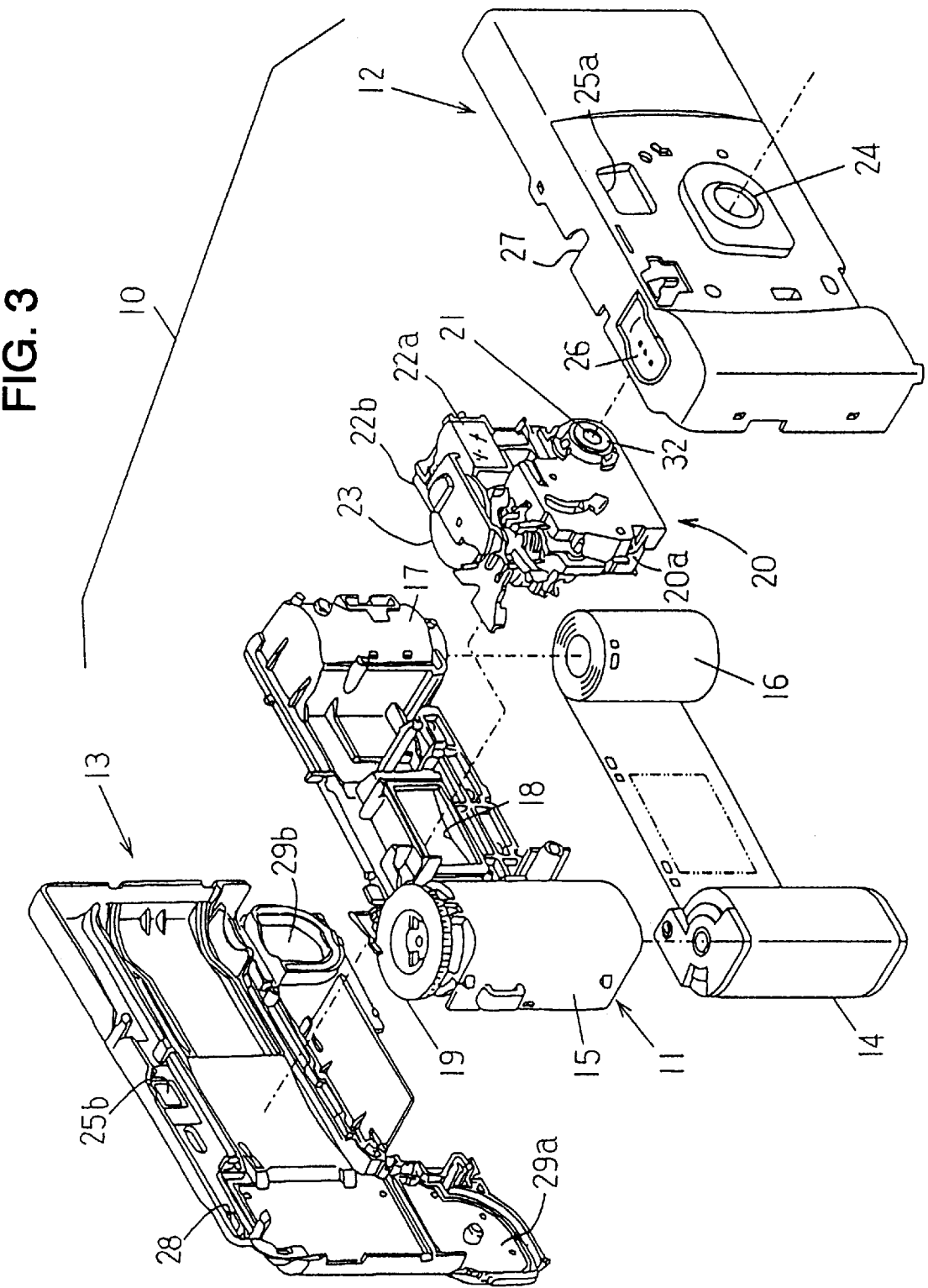
FIG. 3 is an exploded perspective view of the lens-fitted film unit.

Referring to the accompanying drawings in detail, in particular, to FIG. 3 showing a lens-fitted film unit with a single component taking lens installed thereto in accordance with an embodiment of the invention, a generally rectangularly-shaped external unit body 10 comprises a generally rectangular box-shaped light tight outer shell made up of two mating shell halves, namely front and rear covers 12 and 13 and an internal unit body 11 interposed between the front and rear covers 12 and 13. The internal unit body 11 is integrally formed with an open-bottomed cartridge chamber 15 for receiving a film cartridge 14 at one of its opposite ends and an open-bottomed film chamber 17 for receiving a roll of unexposed film strip 16 at another end. The internal unit body 11 has an exposure aperture 18 positioned between the cartridge chamber 15 and the film chamber 17 to define an exposure area on a film and an exposure unit 20 installed in front of the exposure aperture 18 and supported by and between the front and rear covers 12 and 13. The exposure unit 20 comprises a taking lens 21, a viewfinder objective lens 22a, a viewfinder eyepiece lens 22b, a frame counter dial 23 and a shutter mechanism (not shown) all of which are installed to an exposure unit base 20a. The internal unit body 11 is provided with a film advance knob 19 installed to the top of the cartridge chamber 15. The front cover 12 has an opening 24 and a viewfinder objective window 25a formed in a front wall thereof in which the taking lens 21 and the viewfinder objective lens 22a are situated and further has a frame counter window 27 in a top wall thereof through which a frame number on the frame counter dial 23 can be seen. The rear cover 13 has a viewfinder eyepiece window 25b in which the viewfinder eyepiece lens 22b is situated and an opening 28 through which the film advance knob 19 is accessed. The rear cover 13 is provided with flap type bottom lids 29a and 29b connected thereto by flexible hinges to close bottom openings of the cartridge chamber 25 and the film chamber 27, respectively. The internal unit body 11 forms a dark path defined between the taking lens 21 and an unexposed film strip 16 in the film plane by a lens holder (which will be described later), the exposure unit base 20a and the front and rear covers 12 and 13. When the bottom lids 29a and 29b are closed, the interior of the external unit body 10 is made completely light-tight.

Figure 1:
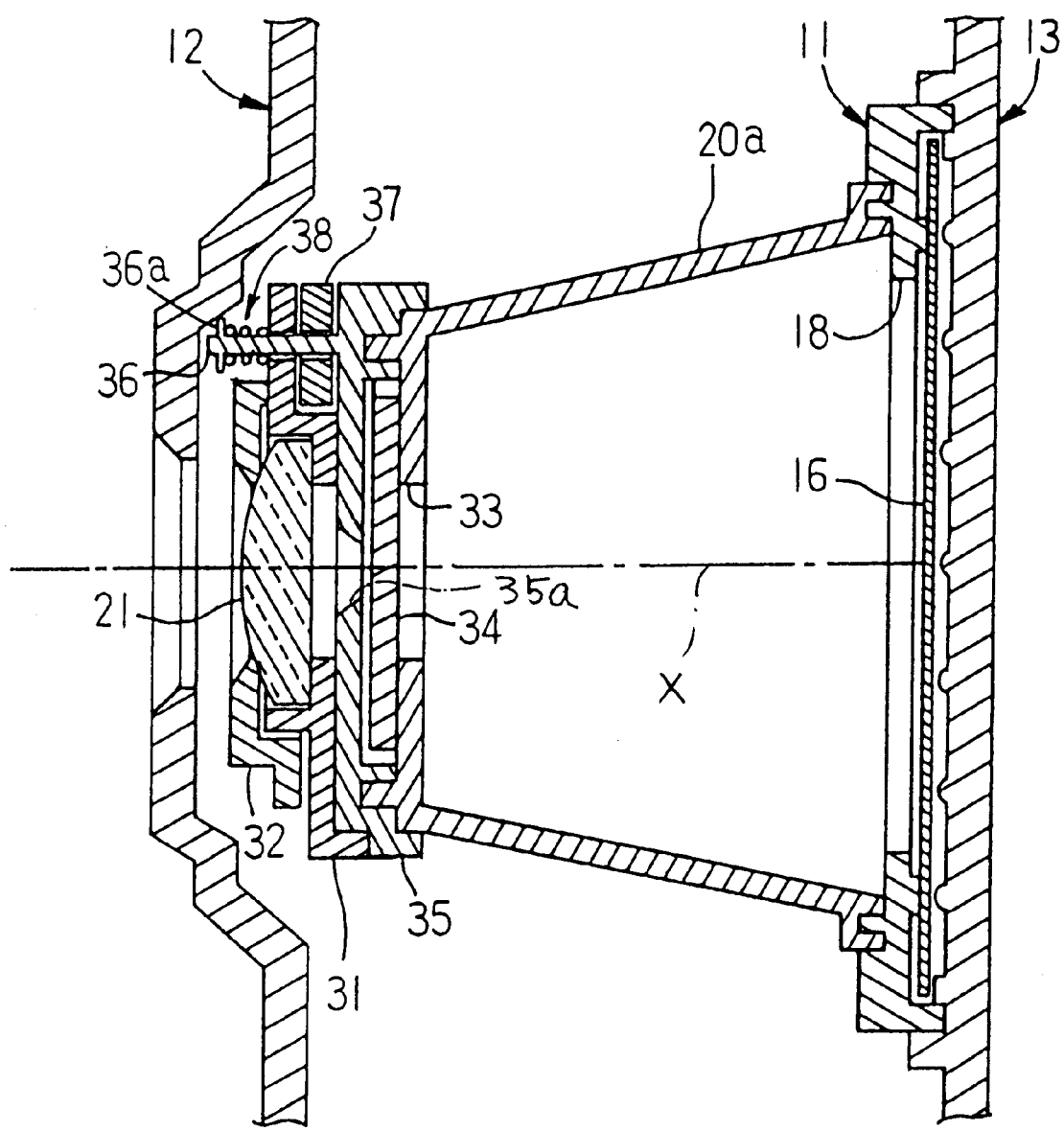
FIG. 1 is a cross-sectional view of a lens-fitted film unit in accordance with an embodiment of the invention.

As shown in FIG. 1, the taking lens 21, which consists of a single injection molded plastic lens element, is fixedly held between a lens holder 31 and a lens fixture 32. The exposure unit 20 includes a shuter blade 34 disposed in front of the exposure unit base 20a to open and close an opening 33 formed in the exposure unit base 20a and a stationary shutter cover 35 formed with an opening 35a. The stationary shutter cover 35 has a guide bar 36 secured thereto to guide axial movement of the lens holder 31 along an optical axis X of the taking lens 21. A thermally expansible block 37 operative as axial distance adjusting means is mounted on the guide bar 36 between the lens holder 31 and the shutter cover 35. A drive spring 38 is mounted on the guide bar 36 between an end stop 36a and the lens holder 31 to force the lens holder 31 against the stationary shutter cover 35 through the axial distance adjusting block 37. The axial distance adjusting block 37 is made up of a thermally expansible material having a thermal expansion coefficient greater than that of the plastic material for the taking lens 21. The material for the axial distance adjusting block 37 may be any one of various types of materials such as metals, ebonite, plastics and woods.

Specifically, preferable metals for the axial distance adjusting block 37 include lithium, potassium, magnesium, zinc, selenium, aluminum, copper, indium, nickel, iron and permaroy, and alloys thereof.

Figure 2A:
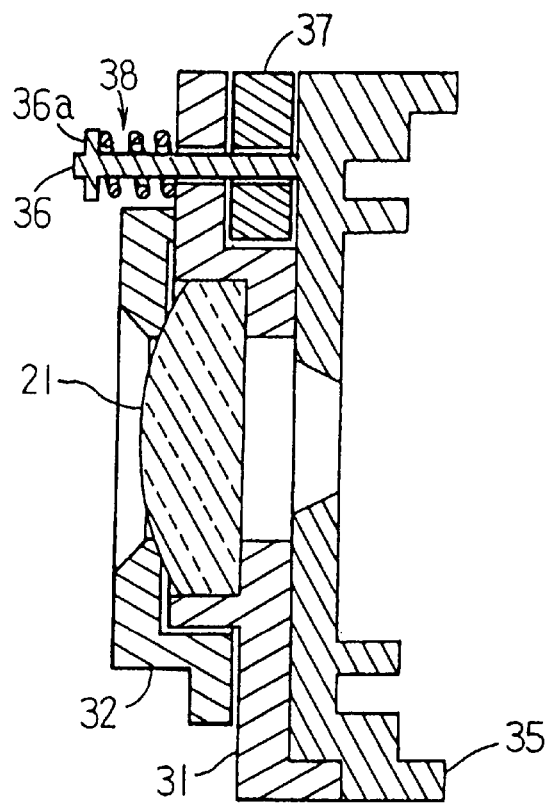
FIG. 2A is a cross-sectional view of an essential part of the lens-fitted film unit with axial diatance adjusting means for compensating a variation of focal length of a taking lens due to a change in normal ambient air temperature.
Figure 2B:
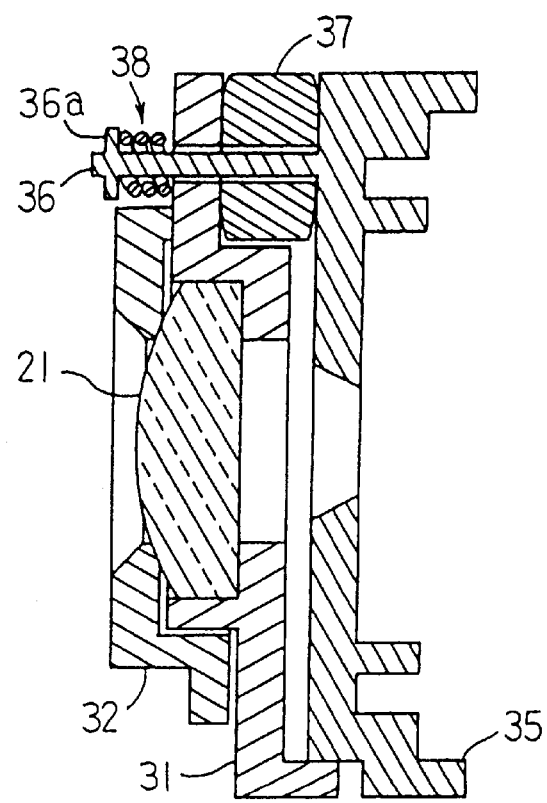
FIG. 2B is a cross-sectional view of an essential part of the lens-fitted film unit with the axial distance adjusting means for compensating a variation of focal length of the taking lens due to a change in high ambient air temperature.
Figure 4A:
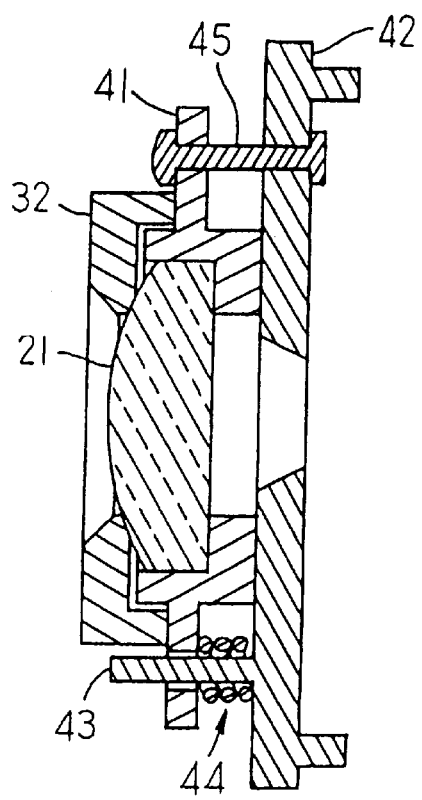
FIG. 4A is a cross-sectional view of an essential part of the lens-fitted film unit with another type of axial distance length adjusting means for compensating a variation of focal length of a taking lens due to a change in normal ambient air temperature.
Figure 4B:
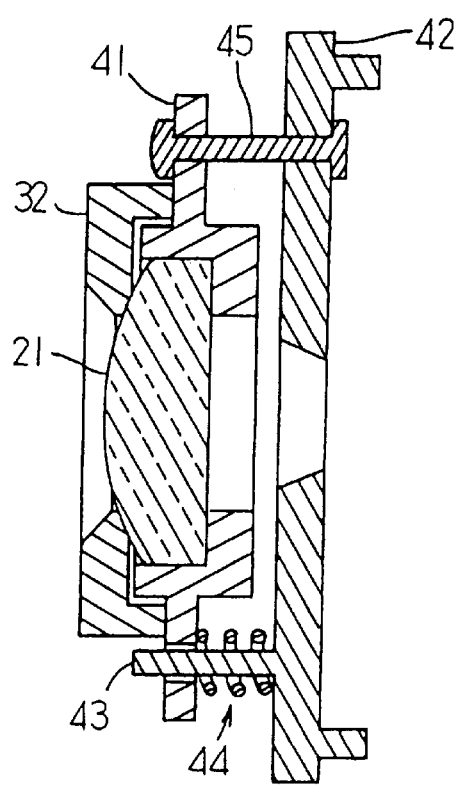
FIG. 4B is a cross-sectional view of an essential part of the lens-fitted film unit with the axial distance adjusting means for compensating a variation of focal length of the taking lens due to a change in high ambient air temperature.

The plastic lens element of the taking lens 21 expands or contracts according to its thermal expansion coefficient due to a change in ambient temperature to vary or weaken the refractive power thereof, which leads to an increase in axial distance between the taking lens 21 and the film plane. For example, the taking lens 21 shifts its focal point behind a predetermined film plane in which the unexposed film strip 16 is situated when the ambient temperature rises above a normal temperature. In the reverse way, the axial distance adjusting block 37 is extended as shown in FIG. 2B according to its thermal expansion coefficient due to a change in ambient temperature. Because the axial distance adjusting block 37 has a greater thermal expansion coefficient than the plastic lens element of the taking lens 21, the axial distance adjusting block 37 produces a greater axial expansion than the plastic lens element of the taking lens 21 for a given change in ambient temperature. At this time, the axial distance adjusting block 37 forces the lens holder 31 forward away from the stationary shutter cover 35 against the drive spring 38 with a result of extending an axial distance between the taking lens 21 and the unexposed film strip 16 in the film plane. The thermal expansion coefficient of the axial distance adjusting block 37 is adjusted such that the axial distance adjusting block 37 produces an axial expansion by which the axial distance between the taking lens 21 and the unexposed film strip 16 in the film plane is extended equally to an increase in focal length of the taking lens 21 for every given ambient temperature change. In this manner, the taking lens 21 always forms an image sharply focused on the unexposed film strip 16 even though there occurs an increase in ambient temperature. On the other hand, when the ambient temperature falls, the plastic lens element of the taking lens 21 contracts according to its thermal expansion coefficient to vary or strengthen the refractive power thereof, which leads to a reduction in focal length of the taking lens 21. Coincidentally, the axial distance adjusting block 37 produces an axial contraction to be restored to its original axial thickness as shown in FIG. 2A from the state shown in FIG. 2B. As a result, the lens holder 31 is forced backward toward the stationary shutter cover 35 by the drive spring 38 with a result of shortening the axial distance between the taking lens 21 and the unexposed film strip 16 in the film plane. In this way, the taking lens 21 always forms an image sharply focused on the unexposed film strip 16 even though there occur s a de crease in ambient temperature. The axial distance adjusting means may comprise a plurality of blocks or rods arranged symmetrically with respect to the optical axis X of the taking lens 21. Further, the axial distance adjusting means may take various forms such as an thermally expandable rod shown in FIGS. 4A and 4B and a bimetal ring shown in FIGS. 5A and 5B or 6A and 6B. Referring to FIGS. 4A and 4B showing the axial distance adjusting means in the form of a n thermally expandable rod, an axial distance adjusting rod 45, which h as a greater thermal expansion coefficient than the plastic lens element of the taking lens 21, is supported by and between a lens holder 41 and a stationary shutter cover 42. The stationary shutter cover 35 has a guide bar 43 secured thereto to guide axial movement of the lens holder 41 along the optical axis X of the taking lens 21. A drive spring 44 is mounted on the guide bar 43 between the lens holder 41 and the shutter cover 42 to urge the lens holder 41 forward. When the ambient temperature rises, the axial distance adjusting rod 45 expands along the optical axis X of the taking lens 21, which is accompanied by axial movement of the lens holder 41 away from the stationary shutter cover 42 under thrust force of the drive spring 44, as shown in FIG. 4B. As a result, the axial distance between the taking lens 21 and the unexposed film strip 16 in the film plane is extended. In the reverse way, when the ambient temperature falls, the axial distance adjusting rod 45 produces an axial contraction and is restored to its original axial thickness as shown in FIG. 4A. As a result, the lens holder 41 is forced backward toward the stationary shutter cover 42 against the drive spring 44 as shown in FIG. 4A from the state shown in FIG. 4B with a result of shortening the axial distance between the taking lens 21 and the unexposed film strip 16 in the film plane. In this manner, the taking lens 21 always forms an image sharply focused on the unexposed film strip 16 even though there occurs an increase or a decrease in ambient temperature.

Figure 5A:
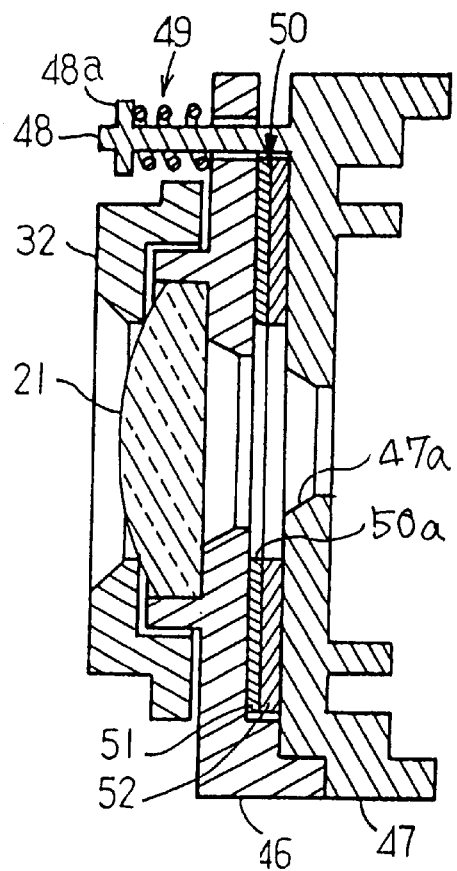
FIG. 5A is a cross-sectional view of an essential part of the lens-fitted film unit with another type of axial distance adjuster for compensating a variation of focal length of a taking lens due to a change in normal ambient temperature.
Figure 5B:
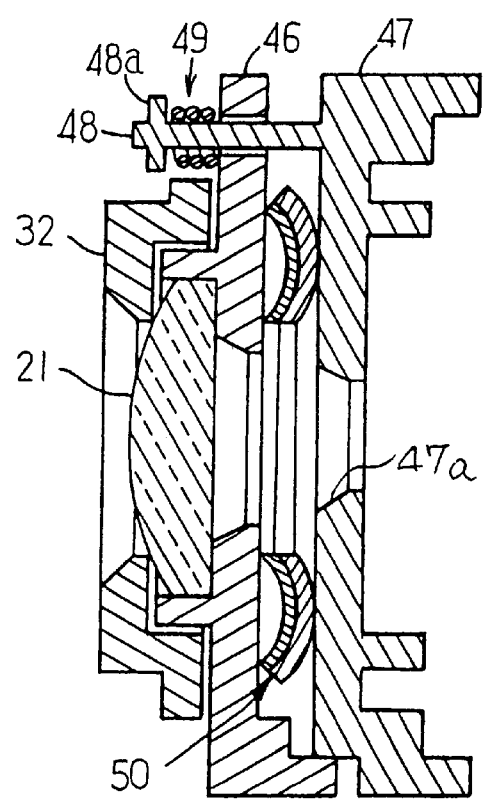
FIG. 5B is a cross-sectional view of an essential part of the lens-fitted film unit with the axial distance adjuster for compensating a variation of focal length of the taking lens due to a change in high ambient temperature.

Referring to FIGS. 5A and 5B showing the axial distance adjusting means in the form of a bimetal ring, an axial distance adjusting bimetal ring 50, which has a greater thermal expansion coefficient than the plastic lens element of the taking lens 21, is made up of two thermally expandable metal rings 51 and 52 having different thermal expansion coefficients and secured to each other. In this embodiment, the metal ring 51 has a smaller thermal expansion coefficient than the metal ring 52. The axial distance adjusting bimetal ring 50 is situated between a lens holder 46 and a stationary shutter cover 47 with a center hole 50a thereof in alignment with an opening 47a of the stationary shutter cover 47 and the metal ring 51 disposed on the object side. The stationary shutter cover 47 has a guide bar 48 secured thereto to guide axial movement of the lens holder 46 along the optical axis X of the taking lens 21. A drive spring 49 is mounted on the guide bar 48 between an end stop 48a and the lens holder 46 to force the lens holder 46 against the stationary shutter cover 35 through the axial distance adjusting bimetal ring 50.

When the ambient temperature rises, the axial distance adjusting bimetal ring 50 bends with the metal ring 51 situated on the inside as shown in Figure SB to increase an apparent thickness in an axial direction, which is accompanied by axial movement of the lens holder 46 away from the stationary shutter cover 47 by the drive spring 49. As a result, the axial distance between the taking lens 21 and the unexposed film strip 16 in the film plane is extended. In the reverse way, when the ambient temperature falls, the axial distance adjusting bimetal ring 50 contracts and is restored to its original axial thickness as shown in FIG. 5A. As a result, the lens holder 46 is forced backward toward the stationary shutter cover 47 by the drive spring 49 as shown in FIG. 5A from the state shown in FIG. 5B with the result of shortening the axial distance between the taking lens 21 and the unexposed film strip 16 in the film plane. In this manner, the taking lens 21 always forms an image sharply focused on the unexposed film strip 16 even though there occurs an increase or a decrease in ambient temperature. The axial distance adjusting bimetal ring 50 bends with its outer and inner edges keeping in contact with the lens holder 46, so that the lens holder 46 remains put in parallel with the stationary shutter cover 47 while forced away from or closely to the stationary shutter cover 47.

Figure 6A:
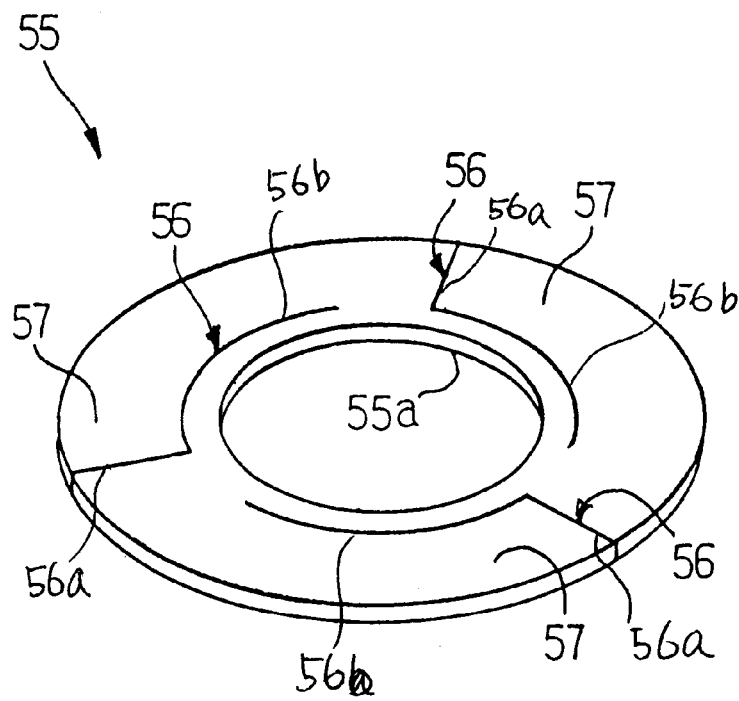
FIGS. 6A and 6B are perspective views showing another type of axial distance adjuster in a normal ambient temperature state and a high ambient temperature state, respectively.
Figure 6B:
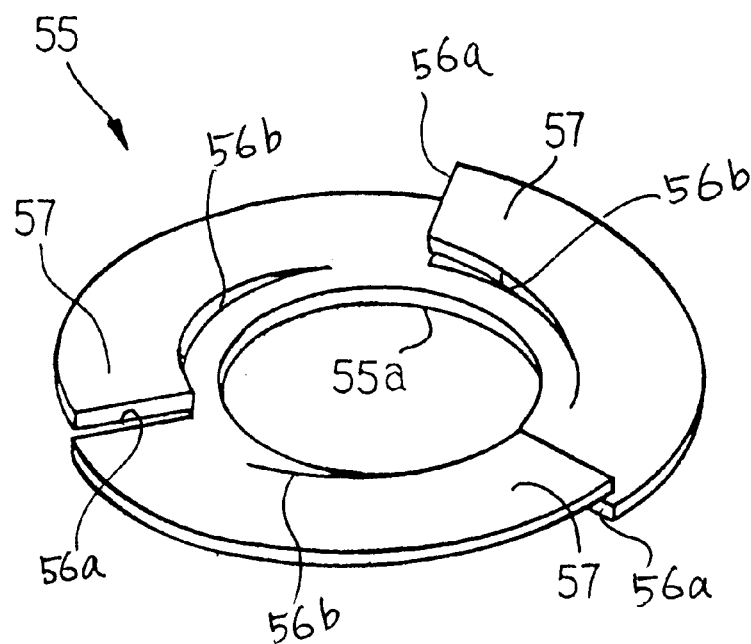
Figure 7:
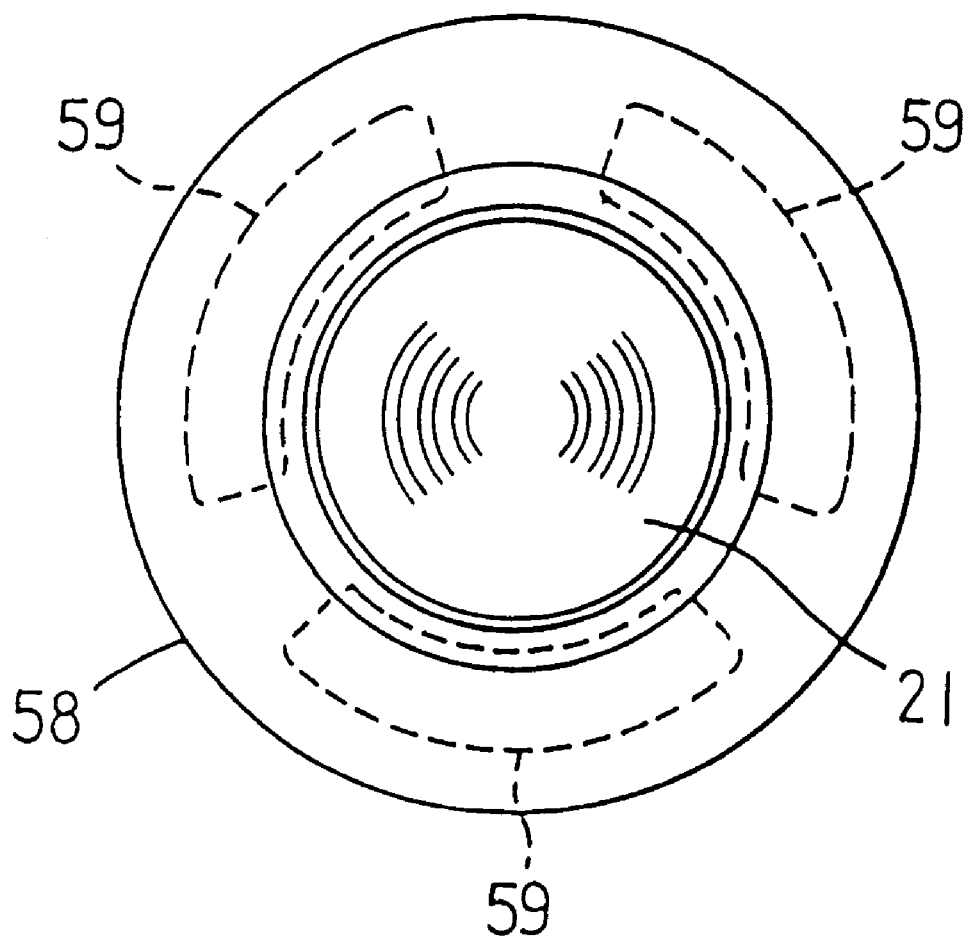
FIG. 7 is a perspective view showing still another type of axial distance adjuster.

FIGS. 6A and 6B show one of variants of the axial distance adjusting bimetal ring 50. An axial distance adjusting bimetal ring 55 having a center hole 55a is made up of two thermally expandable metal rings having different thermal expansion coefficients and secured to each other and is divided into three circular-arcuate bendable sections 57 which are defined by slits 56 arranged at regular angular intervals. Each slit 56 has two slit sections, namely a radial slit section 56a extending between an outer edge and a point close to an inner edge of the axial distance adjusting bimetal ring 55 and a circular-arcuate slit section 56b extending toward the adjacent slit 56 from the inner end of the radial slit section 56a.

According to this variant, when the ambient temperature rises, the bendable sections 57 of the axial distance adjusting bimetal ring 55 bend up along a circumferential direction so as to provide an increase in apparent thickness in an axial direction as shown in FIG. 6B. As a result, the axial distance between the taking lens 21 and the unexposed film strip 16 in the film plane is extended. In the reverse way, when the ambient temperature falls, the axial distance adjusting bimetal ring 55 contracts and is restored to its original axial thickness as shown in FIG. 5A. As a result, the lens holder 46 is forced backward toward the stationary shutter cover 47 as shown in FIG. 5A from the state shown in FIG. 5B with the result of shortening the axial distance between the taking lens 21 and the unexposed film strip 16 in the film plane. In this manner, the taking lens 21 always forms an image sharply focused on the unexposed film strip 16 even though there occurs an increase or a decrease in ambient temperature.

The axial distance adjusting means 50 or 55 shaped in the form of single bimetal ring may be replaced with a plurality of circular-arcuate or simply rectangular bimetal plates 59 secured to the lens holder 58 and arranged symmetrically with respect to the optical axis X of the taking lens 21.

Figure 8A:
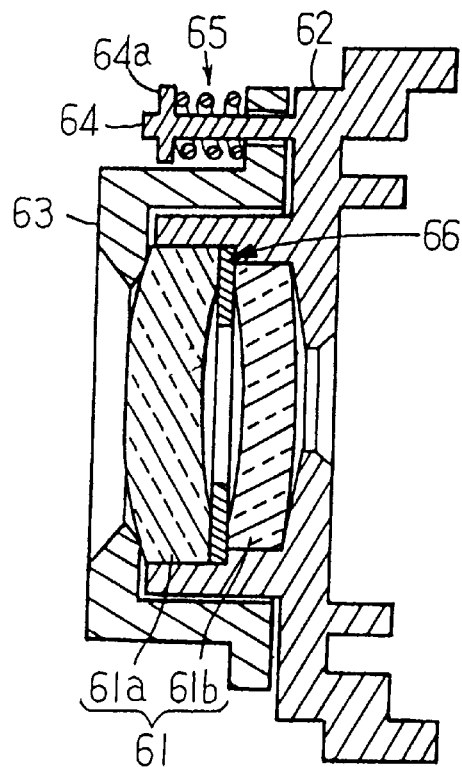
FIGS. 8A and 8B are cross-sectional views of an essential part of the lens-fitted film unit having a two component taking lens accompanied by an axial distance adjuster in a normal ambient temperature state and a high ambient temperature state, respectively.
Figure 8B:
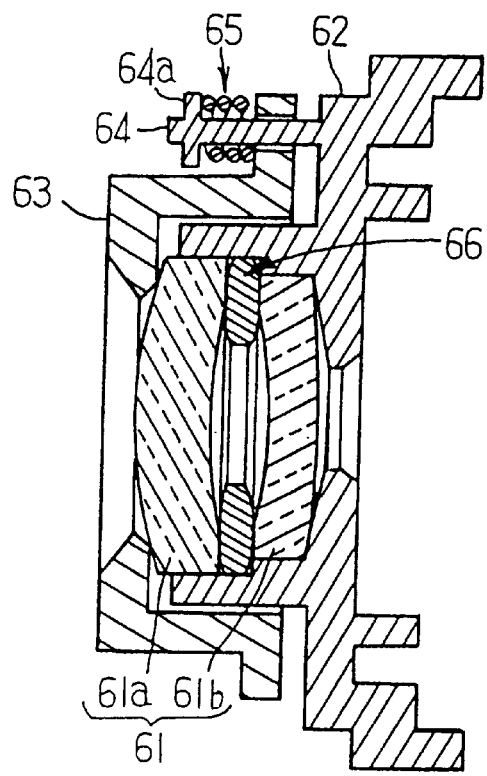

FIGS. 8A and 8B show a lens-fitted film unit with a two component taking lens 61 installed thereto in accordance with another embodiment of the invention. The taking lens 61 consists of two injection molded plastic lens elements, namely a first plastic lens element 61a having positive power and a second plastic lens element 61b having negative power, which are arranged in order from the object side to the image side. The first plastic lens element 61a is fixedly held by a stationary lens holder 62 and the second plastic lens element 61b is supported by the stationary lens holder 62. The lens fixture 63 is supported for axial movement by the stationary lens holder 62. Specifically, the stationary lens holder 62 has a guide bar 64 secured thereto to guide movement of the lens fixture 63 along an optical axis X of the taking lens 61, and a drive spring 65 is mounted on the guide bar 64 between an end stop 64a and the lens fixture 63 to force the lens fixture 63 against the lens holder 62.

The first and second p astic lens elements 61a and 61b are spaced apart from each other at a predetermined axial distance by a thermally expansible ring 66 which is operative as axial distance adjusting means. The axial distance adjusting ring 66 is mad e of a material, such as plastics, having a greater thermal expansion coefficient than each plastic lens element 61a, 61b of the taking lens 61.

When the ambient temperature rises, the first and second plastic lens elements 61a and 61b of the taking lens 61 expand according to their thermal expansion coefficients to vary or weaken their refractive power thereof to cause the taking lens 61 to reduce its focal length. Coincidentally, the axial distance adjusting ring 66 expands in the optical axis X of the taking lens 61, forcing the first plastic lens element 61a forward against the drive spring 65 as shown in FIG. 8B. As a result, the axial distance between the taking lens 61 and the unexposed film strip 16 in the film plane is extended. In the reverse way, when the ambient temperature falls, the axial distance adjusting ring 66 contracts in the axial direction and is restored to its original axial thickness as shown in FIG. 8A. As a result, the lens fixture 63 and the first plastic lens element 61a are forced as one whole axially backward toward the stationary lens holder 62 as shown in FIG. 5A from the state shown in FIG. 5B with the result of shortening the axial distance between the taking lens 21 and the unexposed film strip 16 in the film plane. In this manner, the taking lens 21 always forms an image sharply focused on the unexposed film strip 16 even though there occurs an increase or a decrease in ambient temperature.

The axial distance adjusting ring 66, which is interposed between the first and second plastic lens elements 61a and 61b of the taking lens 61, may be formed as a shield ring operative to block off peripheral light rays from the outside of an aimed scene or a fixed aperture ring operative to control the amount of light rays reaching the film strip with an effect of reducing the number of parts and simplifying the mechanical structure around the taking lens 61.

It is of course possible to install the two component taking lens 61 fixedly between the lens fixture and lens holder movable relative to a stationary shutter cover like shown in FIGS. 2A and 2B or 5A and 5b. In this case, the axial distance adjusting ring 66 is secured to the back of the lens holder so as to axially shift the focal point of the taking lens 61 by displacing both first and second plastic lens elements 61a and 61b as one whole. Further, the two component taking lens 61 may also be installed in the structure like shown in FIGS. 4A and 4B so as to axially shift the focal point of the taking lens 61 by displacing both first and second plastic lens elements 61a and 61b as one whole. However, in the light of smaller axial displacement of plastic lens elements necessary to complete an axial shift of the focal point of the taking lens 61, it is preferred to displace the first plastic lens element 61a only rather than displacing both first and second plastic lens elements 61a and 61b as one whole. Because, in the lens-fitted film unit provided with a two component taking lens, when the axial distance between two plastic lens elements is increased as the ambient temperature rises, an incident angle at which exit light rays from the first plastic lens element enter the second plastic lens element is varied correspondingly with an effect of producing a reduced shift of the focal point of the taking lens due to a change in ambient temperature. Therefore, axially displacing the plastic lens element of the taking lens on the image side toward the unexposed film strip 16 in the film plane to cause an axial shift of the focal point of the taking lens produces the same effect as displacing the plastic lens element of the taking lens on the object side.

Although the axial distance adjusting means has been explained in connection with forms of block, rod and ring in the above embodiments, at least one of the lens holder, the exposure unit base and the internal unit body disposed between the taking lens and the unexposed film strip 16 in the film plane may be made as a thermally expandable plastic member having a thermal expansion coefficient greater than each plastic lens element of the taking lens. According to the structure, when a change in ambient temperature occurs, the thermally expandable plastic member produces an axial thermal expansion or an axial thermal contraction to displace the plastic lens element of the taking lens along the optical axis X of the taking lens with the result of shifting the focal point of the taking lens. Such a structure needs not a change in configuration but only a change in material for the thermally expandable member and eliminates the necessity of using special or extra structural parts, which leads to a restraint on production costs of the lens-fitted film unit.

While the present invention has been described in connection with a lens-fitted film unit with a taking lens consisting of a single plastic lens or multiple plastic lenses by way of example, nevertheless, it may be applied to all types of fixed focus camera with a taking lens consisting of a single plastic lens or multiple plastic lenses.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens-fitted film unit having a unit body which is pre-loaded with a roll of unexposed photographic film strip and equipped with a taking lens comprising a plastic lens element and an exposure mechanism including a shutter, said lens-fitted film unit comprising:
   a lens holder, which is movable in a direction of an optical axis of said taking lens with respect to a film plane in which said unexposed photographic film strip is situated, for fixedly holding said plastic lens element at a predetermined axial distance from said film plane; and
   axial distance adjusting means capable of thermally expanding and contracting and disposed between said lens holder and said film plane for changing an axial distance of said lens holder from said film plane in said direction in accordance with a change in ambient temperature to shift a focal point of said taking lens so as thereby to compensate a variation of said focal point of said taking lens due to a change in refractive power of said plastic lens element which is caused by axial expansion or axial contraction of said plastic lens element due to said change in ambient temperature.

2. The lens-fitted film unit as defined in claim 1, wherein said axial distance adjusting means comprises a thermally expandable ring disposed in said optical axis.

3. The lens-fitted film unit as defined in claim 1, wherein said axial distance adjusting means has a thermal expansion coefficient greater than said plastic lens element.

4. The lens-fitted film unit as defined in claim 1, wherein said axial distance adjusting means is made of one of metals including zinc, selenium, aluminum and permaroy, and alloys of said metals.

5. The lens-fitted film unit as defined in claim 1, wherein said axial distance adjusting means is made of one of non-metallic materials including ebonite, plastics and woods.

6. The lens-fitted film unit as defined in claim 1, wherein said axial distance adjusting means comprises a bimetal plate capable of being warped to change an apparent axial thickness in accordance with a change in ambient temperature.

7. A lens-fitted film unit having a unit body which is pre-loaded with a roll of unexposed photographic film strip and equipped with a taking lens comprising two plastic lens elements and an exposure mechanism including a shutter, said lens-fitted film unit comprising:
   a lens holder for holding said taking lens at a predetermined axial distance from a film plane in which said unexposed photographic film strip is situated, said two plastic lens elements being movable relatively to each other in a direction of an axis of said taking lens; and
   axial distance adjusting means capable of thermally expanding and contracting and disposed between said two plastic lens elements for changing an axial distance between said two plastic lens elements in said direction in accordance with a change in ambient temperature to shift a focal point of said taking lens, so as thereby to compensate a variation of a focal length of said taking lens due to changes in refractive power of said two plastic lens elements which are caused by axial expansion or axial contraction of said two plastic lens elements due to said change in ambient temperature.

8. The lens-fitted film unit as defined in claim 7, wherein said lens holder fixedly holds either one of said two plastic lens elements and movably holds another of said two plastic lens elements to be displaced relatively to said one of said two plastic lens elements in said direction by said axial distance adjusting means in accordance with a change in ambient temperature.

9. The lens-fitted film unit as defined in claim 7, wherein said axial distance adjusting means comprises a thermally expandable ring disposed in said optical axis between said two plastic lens elements.

10. The lens-fitted film unit as defined in claim 9, wherein said thermally expandable ring comprises one of a light shield ring and a fixed aperture ring.

11. The lens-fitted film unit as defined in claim 7, wherein said axial distance adjusting means has a thermal expansion coefficient greater than said plastic lens element.

12. The lens-fitted film unit as defined in claim 7, wherein said axial distance adjusting means is made of one of metals including zinc, selenium, aluminum and permaroy, and alloys of said metals.

13. The lens-fitted film unit as defined in claim 7, wherein said axial distance adjusting means is made of one of non-metallic materials including ebonite, plastics and woods.

14. The lens-fitted film unit as defined in claim 7, wherein said axial distance adjusting means comprises a bimetal plate capable of being warped to change an apparent axial thickness in accordance with a change in ambient temperature.

15. The lens-fitted film unit as defined in claim 7, wherein said axial distance adjusting means comprises a bimetal ring formed with a plurality of circular-arcuate sections which are defined by slits so as to bend in a circumferential direction in accordance with a change in ambient temperature to change an apparent axial thickness of said bimetal ring.

16. A lens-fitted film unit;

a unit body;

a roll of unexposed photographic film strip pre-loaded in said unit body;

a taking lens comprising at least one plastic lens element installed to said unit body;

an exposure mechanism including a shutter which is installed in said unit body; and a lens holder for fixedly holding said plastic lens element at a predetermined axial distance from a predetermined film plane in which said unexposed photographic film strip is situated;

said unit body at least between said taking lens and said predetermined film plane being capable of thermally expanding and contracting in a direction of an axis of said taking lens to change an axial distance between said lens holder and said film plane in accordance with a change in ambient temperature so as thereby to shift a focal point of said taking lens to compensate a variation of a focal length of said taking lens due to a change in refractive power of said plastic lens element which is caused by axial expansion or axial contraction of said plastic lens element due to said change in ambient temperature.

* * * * *

UNITED STATES PATENT AND TRADEMARK OFFICE
CERTIFICATE OF CORRECTION

PATENT NO. : 6,188,841 B1  
DATED : February 13, 2001  
INVENTOR(S) : Kazuo Kamata Page 1 of 1

It is certified that error appears in the above-identified patent and that said Letters Patent is hereby corrected as shown below:

<u>Title page,</u>  
Insert item [30] as follows:

-- [30]    Foreign Application Priority Data

May 27, 1998    [JP]    Japan........10-146108 --.

Signed and Sealed this

Eighteenth Day of September, 2001

Attest:

NICHOLAS P. GODICI  
*Attesting Officer*    *Acting Director of the United States Patent and Trademark Office*